US011779504B2

(12) United States Patent
Kim et al.

(10) Patent No.: US 11,779,504 B2
(45) Date of Patent: Oct. 10, 2023

(54) WEARABLE APPARATUS FOR INCREASING MUSCULAR FORCE

(71) Applicants: HYUNDAI MOTOR COMPANY, Seoul (KR); KIA MOTORS CORPORATION, Seoul (KR)

(72) Inventors: Kyu Jung Kim, Seoul (KR); Ju Young Yoon, Suwon-si (KR); Hyun Seop Lim, Anyang-si (KR); Ki Hyeon Bae, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1118 days.

(21) Appl. No.: 16/516,019

(22) Filed: Jul. 18, 2019

(65) Prior Publication Data
US 2020/0188212 A1 Jun. 18, 2020

(30) Foreign Application Priority Data

Dec. 12, 2018 (KR) .................. 10-2018-0160116

(51) Int. Cl.
*B25J 9/00* (2006.01)
*A61H 1/02* (2006.01)

(52) U.S. Cl.
CPC .......... *A61H 1/0281* (2013.01); *B25J 9/0006* (2013.01); *A61H 2201/165* (2013.01);
(Continued)

(58) Field of Classification Search
CPC .......... A61H 1/0281; A61H 2201/1616; A61H 2201/165; A61H 2201/1614; B25J 9/0006
See application file for complete search history.

(56) References Cited

U.S. PATENT DOCUMENTS 4,180,870 A * 1/1980 Radulovic ............... A61F 5/013
601/33
9,889,554 B2 2/2018 Van Engelhoven
(Continued)

FOREIGN PATENT DOCUMENTS

JP 2017533833 A 11/2017
KR 20180053276 A 5/2018
(Continued)

OTHER PUBLICATIONS

Comau MATE—HUMANufacturing experience; https://www.youtube.com/watch?v=b4B2xL7AR6Y; Jun. 19, 2018; Comau; 1 pp.
(Continued)

*Primary Examiner* — Timothy A Stanis
(74) *Attorney, Agent, or Firm* — LEMPIA SUMMERFIELD KATZ LLC

(57) ABSTRACT

A wearable apparatus for increasing muscular force includes: a mount body coupled to an upper body of a wearer; a shoulder frame coupled at one end thereof to the mount body at the dorsal surface of the wearer and which is rotatable in up and down direction; a mounting frame coupled at one end thereof to the other end of the shoulder frame to be torsionally rotated; a supporter, which surrounds part of an upper arm of the wearer to support the upper arm of the wearer; and a compensation frame, which is integrally coupled to the supporter to be rotated together with the supporter about a shoulder joint of the wearer. The compensation frame capable of generating supporting force that varies depending on the angle to which the compensation frame is rotated.

21 Claims, 14 Drawing Sheets

(52) U.S. Cl.
CPC ................ *A61H 2201/1616* (2013.01); *A61H 2201/1659* (2013.01)

(56) References Cited

U.S. PATENT DOCUMENTS

| | | | |
|---|---|---|---|
| 10,071,477 B2 | 9/2018 | Van Engelhoven | |
| 10,617,551 B2 | 4/2020 | Doyle et al. | |
| 2007/0225620 A1* | 9/2007 | Carignan | B25J 17/025 601/5 |
| 2011/0164949 A1* | 7/2011 | Kim | B25J 9/0006 414/1 |
| 2012/0172769 A1* | 7/2012 | Garrec | B25J 9/0006 601/33 |
| 2012/0184880 A1* | 7/2012 | Doyle | B25J 9/0006 601/33 |
| 2013/0060171 A1* | 3/2013 | Fu | A61H 1/00 601/5 |
| 2014/0033391 A1* | 2/2014 | Doyle | A61B 90/53 2/16 |
| 2014/0158839 A1* | 6/2014 | Doyle | A61B 90/60 248/118 |
| 2016/0339583 A1* | 11/2016 | Van Engelhoven | B25H 1/10 |
| 2017/0173783 A1* | 6/2017 | Angold | B25J 9/109 |
| 2017/0224517 A1 | 8/2017 | Doyle et al. | |
| 2017/0296418 A1 | 10/2017 | Lee | |
| 2018/0303699 A1* | 10/2018 | Romo | A61F 5/013 |
| 2019/0083350 A1* | 3/2019 | Weidner | A61F 5/026 |
| 2019/0118371 A1* | 4/2019 | Sasaki | A61F 2/54 |
| 2020/0139537 A1* | 5/2020 | Moisè | A61H 3/00 |

FOREIGN PATENT DOCUMENTS

| | | |
|---|---|---|
| KR | 101896181 B1 | 9/2018 |
| WO | 2016187275 A1 | 11/2016 |

OTHER PUBLICATIONS

Office Action cited in corresponding Korean patent application No. KR10-2018-0160116; dated Jul. 1, 2023; 10pp.

* cited by examiner

WEARABLE APPARATUS FOR INCREASING MUSCULAR FORCE

CROSS-REFERENCE TO RELATED APPLICATION

This application claims priority to and the benefit of Korean Patent Application No. 10-2018-0160116, filed on Dec. 12, 2018 in the Korean Intellectual Property Office, the disclosure of which is incorporated herein by reference.

BACKGROUND

1. Field of the Disclosure

The present disclosure relates to a wearable apparatus for increasing muscular force, and more particularly to a wearable apparatus for increasing muscular force, which compensates for a load attributable to gravitational force to support the upper arm of a wearer.

2. Description of the Related Art

A wearable robot is a robot which is constructed to be worn on a certain portion of a human body or to support a certain portion of a human body to assist the motion of the human body, and has been designed for medical, military or working purposes. In particular, a wearable working robot is designed to reduce the load applied to a worker, thereby preventing damage to the worker and increasing the muscular force of the worker. Such a wearable robot is configured to simulate the external skeleton of a wearer. The key point in the manufacture thereof is to design joints to perform motion that is identical to actual motion of a human body.

In particular, a wearable apparatus, which is designed to increase the muscular force of an upper arm of a human, typically includes a manual support device, which is constructed to assist a user in supporting the weight of a tool. A typical manual support device is constructed to compensate for gravitational force using a combination of structural elements, springs, cables and pulleys. Such a manual support device is designed to compensate for gravitational force within a limited range of motion.

However, upward and downward motion of a shoulder of a human body is not realized by simple rotational motion of a joint of an upper arm. Such upward and downward motion of a shoulder is the result of complex articulated movement of a shoulder blade and a collarbone. When an upper arm of a human body is raised, the joint of the upper arm is raised while being rotated, and the shoulder blade, serving as the rotational axis, is also raised simultaneously. In other words, the motion is characterized in that the joint of the upper arm is rotated and, at the same time, the rotational axis is raised.

In wearable apparatuses for increasing the muscular force of an upper arm according to the conventional technology, the motion of a wearer is restricted depending on his/her external skeleton. Accordingly, since the operating range of the complex joint of a shoulder is limited, there are problems in that the behavior of a wearer is restricted and in that the movement of the wearer becomes inconvenient.

The information disclosed in this Background section is only to enhance understanding of the general background and should not be taken as an acknowledgement or any form of suggestion that this information forms the prior art already known to a person having ordinary skill in the art.

SUMMARY

Therefore, the present disclosure has been made in view of the above problems. It is an object of the present disclosure to provide a wearable apparatus, which provides force capable of compensating for a load without interfering with the complex motion of a shoulder of a wearer.

In accordance with an aspect of the present disclosure, the above and other objects can be accomplished by the provision of a wearable apparatus for increasing muscular force. The wearable apparatus includes a mount body securely coupled to an upper body of a wearer. The wearable apparatus further includes a shoulder frame having one end coupled to the mount body at a dorsal surface of the wearer and having another end that is rotatable vertically about the one end at the dorsal surface of the wearer. The wearable apparatus also includes a mounting frame having one end coupled to the other end of the shoulder frame so as to be torsionally rotated. The wearable apparatus further includes a supporter which surrounds part of an upper arm of the wearer to support the upper arm of the wearer. The wearable apparatus also includes a compensation frame integrally coupled to the supporter so as to be rotated together with the supporter about a shoulder joint of the wearer. The compensation frame is capable of generating a supporting force that varies depending on an angle to which the compensation frame is rotated with respect to the mounting frame.

The mount body may include an upper mount coupled to a dorsal surface of the wearer at a height close to a shoulder blade of the wearer. The mount body may further include a lower mount coupled to the dorsal surface of the wearer at a position close to a lumbar spine of the wearer in a state of being vertically spaced apart from the upper mount. The mount body may also include a mount link extending vertically so as to connect the upper mount to the lower mount.

The lower mount may be coupled to a lower back or hip of the wearer via a lower harness. The upper mount may be coupled to the wearer via an upper harness. The upper harness may extend in a forward direction of the wearer by way of a shoulder of the wearer and may be coupled to the lower harness or the lower mount.

The mount link may be coupled to the lower mount so as to slide vertically.

The mount body may include a first connecting link and a second connecting link, which are connected to the mount link and the lower mount in the state of being vertically spaced apart from each other. The first connecting link and the second connecting link may be rotatably coupled to one or more of the mount link and the lower mount.

The wearable apparatus may further include a support link having one end, which is slidably coupled to the shoulder frame so as to be rotated about a rotational axis that is parallel to the mount link. The support link may have another end that is coupled to the mount link so as to allow the one end of the support link to be rotated vertically about the other end of the support link in a direction that is parallel to the mount link.

The wearable apparatus may further include a support link having one end, which is coupled to the shoulder frame so as to be rotated about a rotational axis that is perpendicular to a sliding direction of the support link and so as to be slidable laterally along the shoulder frame. The support link may have another end that is coupled to the mount body via a rotational shaft, which extends vertically. The support link may transmit, to the mount body, a force that counteracts force that supports the compensation frame.

The shoulder frame may include a first shoulder frame, which is coupled to the mount body. The shoulder frame may further include a second shoulder frame, which is positioned at a dorsal surface of the wearer and is coupled to the first shoulder frame so as to slide laterally with respect to the first shoulder frame and to be rotated laterally about the first shoulder frame.

The second shoulder frame may be coupled to the first shoulder frame so as to be rotated laterally with respect to the first shoulder frame only within a predetermined angle.

The first shoulder frame may include a first sliding hole which extends in a lateral direction of the wearer. One end of the second shoulder frame may be fitted into the first sliding hole and slide along the first sliding hole.

The second shoulder frame may include a second sliding hole, which extends in a lateral direction of the wearer. The shoulder frame may include a restrictor having one end, which is rotatably coupled to the first shoulder frame at a point that is laterally spaced apart from the first sliding hole. The restrictor may have another end, which is slidably and rotatably coupled to the second sliding hole, thereby restricting a relative rotational angle between the first shoulder frame and the second shoulder frame.

The mount body may include a stopper. The stopper may allow one end of the first shoulder frame to be rotated vertically about another end of the first shoulder frame and to cause the one end of the first shoulder frame to be rotated only within a predetermined angle.

The shoulder frame may further include a third shoulder frame. The third shoulder frame may be coupled to the second shoulder frame positioned at the dorsal surface of the wearer so as to be rotated in a lateral direction and may extend in a direction toward a lateral side surface of the wearer. The shoulder frame may also include a fourth shoulder frame, which is positioned at the lateral side surface of the wearer. The one end of the mounting frame may be coupled to the fourth shoulder frame so as to be torsionally rotated.

The one end of the mounting frame may be coupled to the other end of the shoulder frame via an insert rotational shaft. The insert rotational shaft may be coupled to the other end of the shoulder frame so as to be torsionally rotated. The mounting frame may include an insert protrusion, which is positioned at a point spaced apart from the insert rotational shaft between the one end of the mounting frame and the other end of the shoulder frame and may project toward the shoulder frame. The shoulder frame may include an insert hole, which is formed so as to correspond to an orbit that is defined by the insert protrusion when the mounting frame is torsionally rotated to a predetermined angle. The insert protrusion may be disposed in the insert hole so as to allow the mounting frame to be torsionally rotated within a predetermined angle.

The compensation frame may include a spring. The spring may provide elastic force that varies in intensity depending on an angle to which the compensation frame is rotated with respect to the mounting frame so as to generate supporting force counteracting gravitational force.

The wearable apparatus may further include a switch. The switch may slide together with the supporter in a direction in which the compensation frame extends, which may be parallel to the upper arm of the wearer, and which may be capable of being engaged with the compensation frame so as to restrict sliding movement of the supporter. When the switch is engaged with the compensation frame, sliding movement of the supporter is stopped and the supporter is rotated together with the compensation frame.

The compensation frame may include a sliding rail capable of sliding in a direction in which the compensation frame extends, and a plurality of locking holes, which are spaced apart from each other along the sliding rail. The switch may include a lever including locking protrusions, which project from opposite ends thereof toward the compensation frame and which are fitted into or separated from the locking holes depending on rotation of the lever. The sliding movement of the switch along the compensation frame may be blocked when the locking protrusions are fitted into the locking holes.

The switch may include an elastic member, which provides elastic force required to rotate the lever in a direction in which the locking protrusions are fitted into the locking holes.

The switch may include a press portion. The press portion may be spaced apart from a rotational axis of the lever and may project in a lateral direction of the lever so as to press the lever. The lever may be rotated in a direction in which the locking protrusion is separated from the locking holes when the press portions are pressed by a pressing force higher than an elastic force of the elastic member.

A permanent magnet may be provided at at least one of each of the locking protrusions and each of the locking holes so as to provide attractive force generated by the permanent magnet.

In accordance with another aspect of the present disclosure, a wearable apparatus for increasing muscular force includes a mount body securely coupled to an upper body of a wearer. The wearable apparatus may further include a shoulder frame having one end, which is coupled to the mount body at a dorsal surface of the wearer. The shoulder frame includes another end that is rotatable vertically about the one end of the shoulder frame coupled to the mount body. The wearable apparatus also includes a supporter, which surrounds part of an upper arm of the wearer to support the upper arm of the wearer. The wearable apparatus further includes a compensation frame, which is integrally coupled to the supporter so as to be rotated together with the supporter about a shoulder joint of the wearer and which is connected to the shoulder frame at a lateral side surface of the wearer so as to generate supporting force that varies depending on an angle to which the compensation frame is rotated about the shoulder joint of the wearer.

In accordance with a further aspect of the present disclosure, there is provided a wearable apparatus for increasing muscular force. The wearable apparatus includes a mount body securely coupled to an upper body of a wearer. The wearable apparatus further includes a shoulder frame having one end, which is coupled to the mount body at a dorsal surface of the wearer. The shoulder frame has another end that is rotatable vertically about the one end of the shoulder frame coupled to the mount body. The wearable apparatus also includes a support link having one end, which is rotatably coupled to a rotational axis that is perpendicular to a sliding direction so as to slide laterally along the shoulder frame. The support link has another end that is rotatably coupled to the mount body via a vertical rotational shaft so as to transmit, to the mount body, force that counteracts a force that supports a compensation frame. The wearable apparatus also includes a supporter, which surrounds part of an upper arm of the wearer to support the upper arm of the wearer. The wearable apparatus further includes the compensation frame, which is integrally coupled to the supporter so as to be rotated together with the supporter about a shoulder joint of the wearer and which is connected to the shoulder frame at a lateral side surface of the wearer so as to generate supporting force that varies depending on an angle to which the compensation frame is rotated about the shoulder joint of the wearer.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
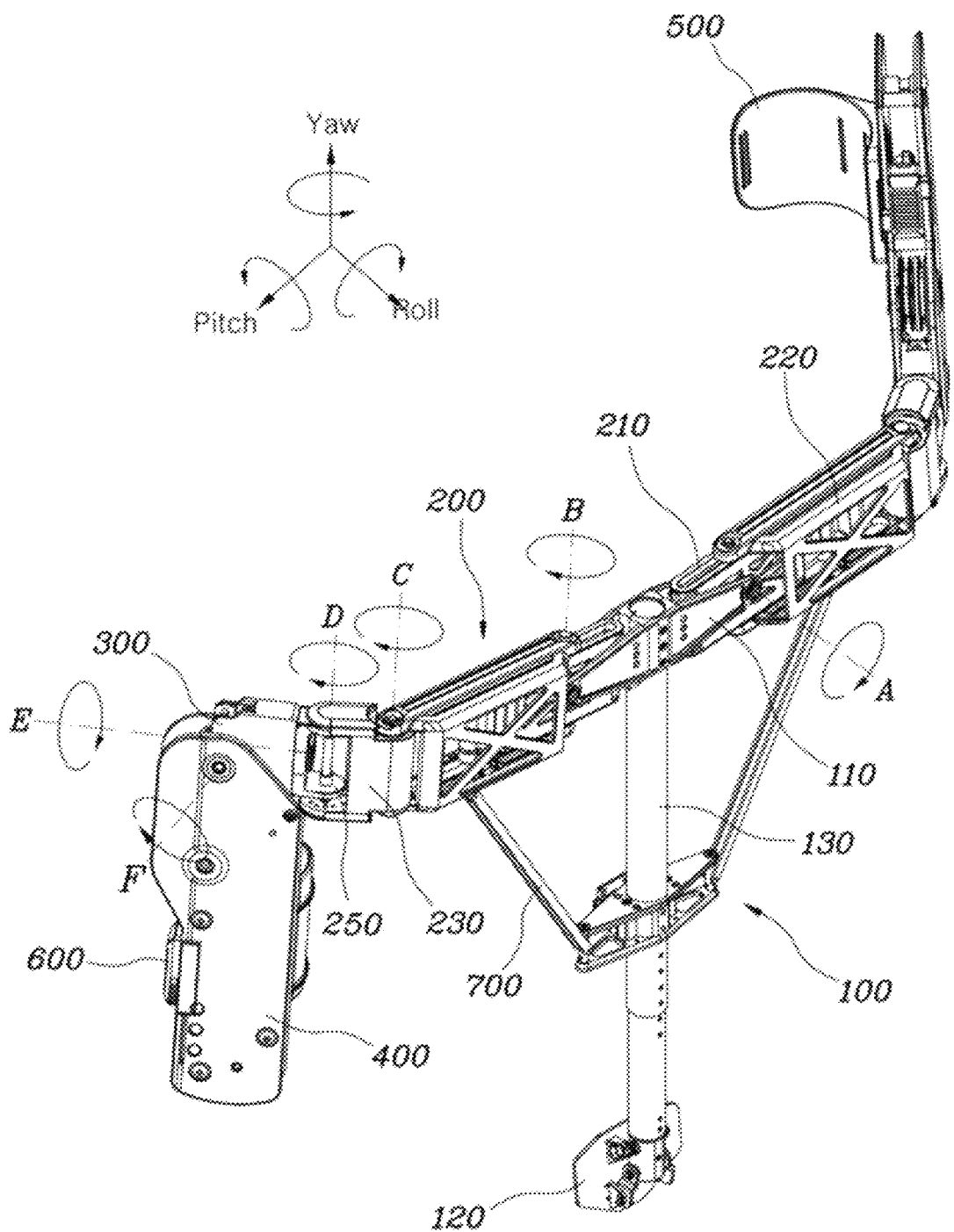
FIG. 1 is a perspective view showing a wearable apparatus for increasing muscular force according to an embodiment of the present disclosure.

Various embodiments are now described more fully with reference to the accompanying drawings, in which various embodiments are shown. Specific structural and functional details disclosed herein are merely representative for the purpose of describing various embodiments. The present disclosure, however, may be embodied in many alternate forms and should not be construed as being limited only to the embodiments set forth herein.

Accordingly, while various embodiments of the disclosure may be variously modified and taking alternative forms, embodiments thereof are shown by way of example in the drawings and will herein be described in detail. It should be understood, however, that there is no intent to limit the present disclosure to the particular embodiments disclosed. On the contrary, various embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the various embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent" etc.).

The terminology used herein is for the purpose of describing particular embodiments only and is not intended to be limiting of the various embodiments of the disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein, which include technical or scientific terms, have the same meanings as those generally appreciated by a person having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Reference will now be made in detail to the various embodiments of the present disclosure, examples of which are illustrated in the accompanying drawings. Wherever possible, the same reference numbers will be used throughout the drawings to refer to the same or like parts.

Figure 2:
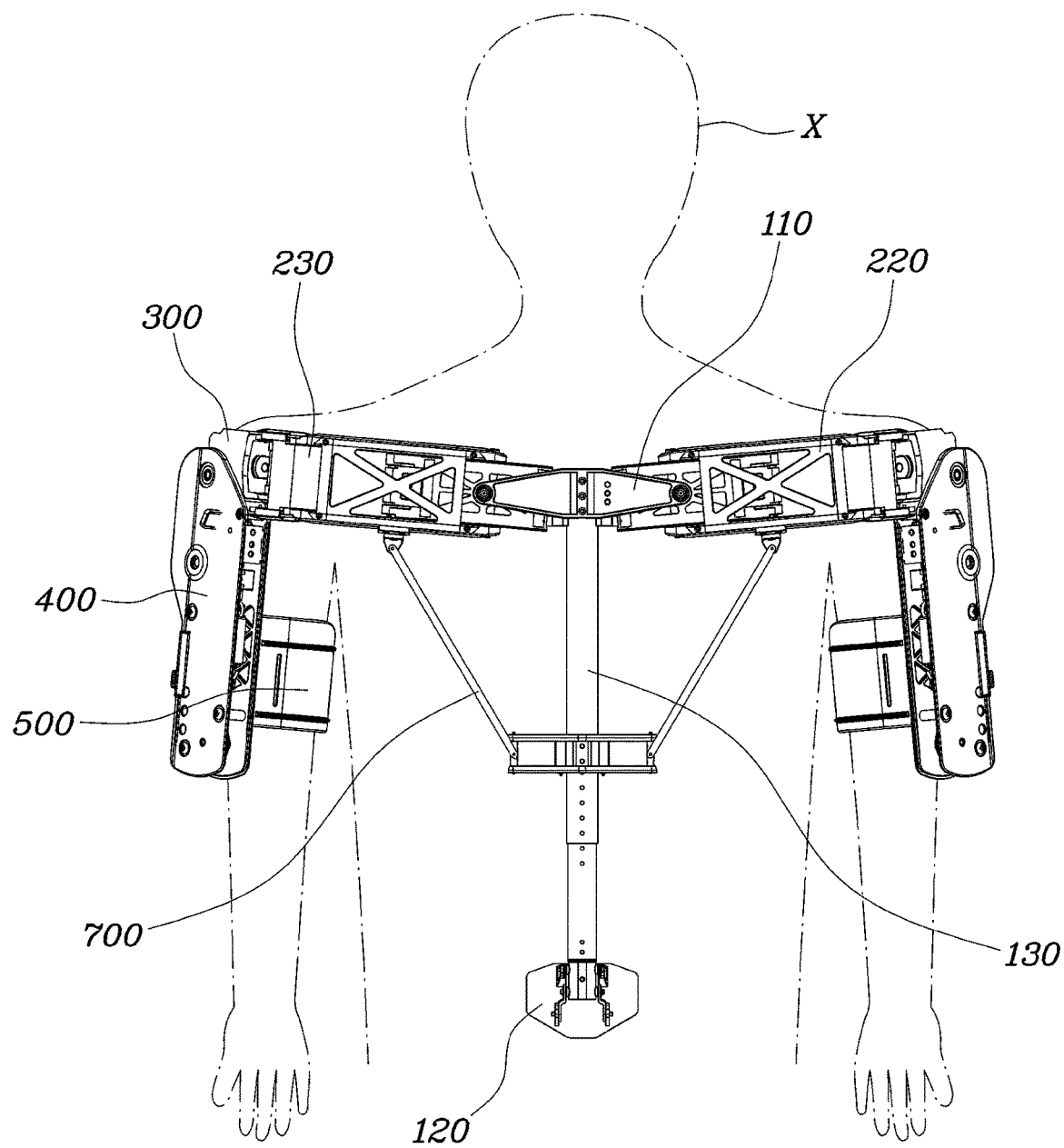
FIG. 2 is a view showing the wearable apparatus which is worn by a wearer, according to an embodiment of the present disclosure.

FIG. 1 is a perspective view of a wearable apparatus for increasing muscular force according to an embodiment of the present disclosure. FIG. 2 is a view showing the wearable apparatus for increasing muscular force, which is worn by a wearer X according to an embodiment of the present disclosure.

Referring to FIGS. 1 and 2, the wearable apparatus for increasing muscular force according to the embodiment of the present disclosure includes a mount body 100 securely coupled to an upper body of the wearer X. The wearable apparatus further includes a shoulder frame 200, which is coupled at one end thereof to the mount body 100 at the dorsal surface of the wearer X and which is rotatable vertically at the other end thereof about the one end in up and down direction in the state of being in contact with the dorsal surface of the wearer X. The wearable apparatus also includes a mounting frame 300, which is coupled at one end thereof to the other end of the shoulder frame 200 so as to be torsionally rotated. The wearable apparatus further includes a supporter 500 which surrounds part of the upper arm of the wearer X to support the upper arm of the wearer X, and a compensation frame 400 integrally coupled to the supporter 500 so as to be rotated therewith about the shoulder joint of the wearer X. The compensation frame 400 may be intended to generate supporting force that varies depending on the angle to which the compensation frame 400 is rotated with respect to the mounting frame 300.

The wearable apparatus for increasing muscular force may be mounted on only one arm of the wearer X or may be mounted on the two arms of the wearer X such that two sets of shoulder frames 200, mounting frames 300, compensating frames 400 and supporters 500 are provided at the single mount body 100.

The wearable apparatus for increasing muscular force according to the embodiment of the present disclosure includes components that are rotatable about a plurality of rotational axes. In particular, the wearable apparatus includes components rotatable in a roll direction (about rotational axes A and E, which extend, for example, in a direction perpendicular to the dorsal surface of the wearer X or in a direction that is parallel to the direction). The wearable apparatus further includes components rotatable in a pitch direction (about a rotational axis F, which extends, for example, in a direction perpendicular to the lateral side surface of the wearer X or in a direction that is parallel to the direction). The wearable apparatus also includes components rotatable in a yaw direction (about rotational axes B, C and D, which extend parallel to the direction of gravitational force). Each of the rotatable components is rotatable in the roll, pitch or yaw direction about a corresponding one of the rotational axes. Some of the rotational axes may be changed.

Specifically, the components of the wearable apparatus according to the embodiment of the present disclosure are rotatable in any direction among the roll, pitch and yaw directions so as to simulate complex motion of the shoulder joint of the wearer X without interfering with the motion.

In particular, the wearer X is able to perform a motion of rotating his/her upper arm or lower arm in a horizontal plane (about the rotational axes B, C and D), a motion of lifting or rotating his/her shoulder blade upwards (about the rotational axis A) and a torsional motion of pronating his/her upper arm inwards or supinating his/her upper arm outwards (about the rotational axis E). Furthermore, the wearer X is able to perform a motion of rotating his/her upper arm upwards or downwards about the shoulder joint (the rotational axis F). In this motion, supporting force is generated by a gravity compensation device of the compensation frame 400, to be described later.

Figure 3:
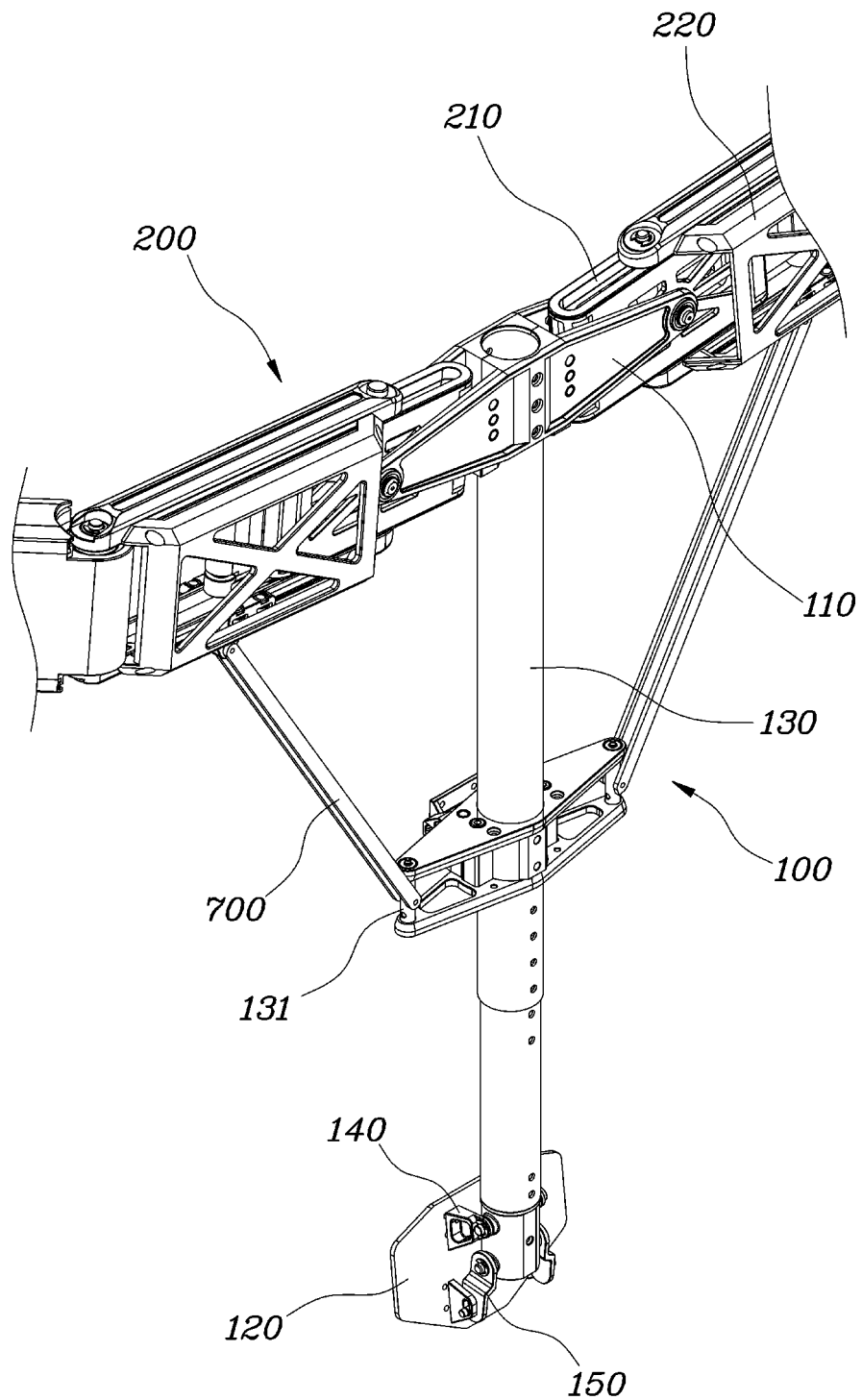
FIGS. 3 and 4 are views showing a mount body of the wearable apparatus according to an embodiment of the present disclosure.
Figure 4:
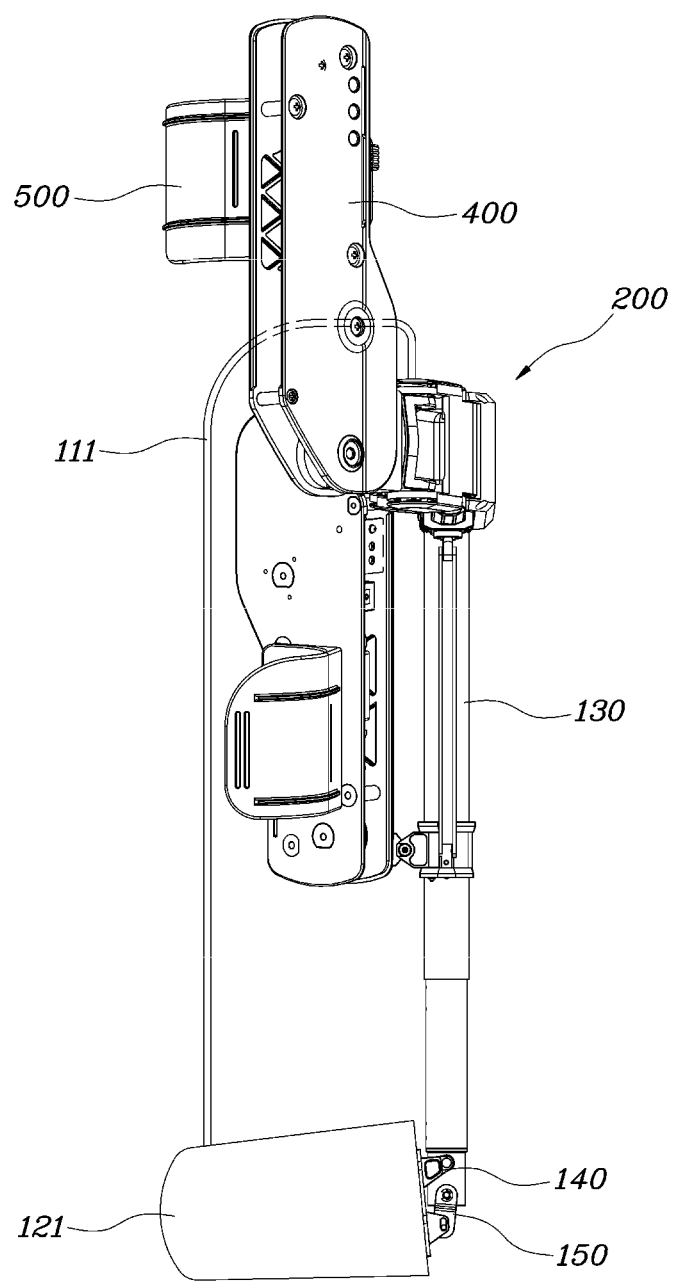

FIGS. 3 and 4 show the mount body 100 of the wearable apparatus for increasing muscular force according to an embodiment of the present disclosure.

Referring to FIGS. 3 and 4, the mount body 100 may include an upper mount 110 coupled to the dorsal surface of the wearer X at a height close to the shoulder blade of the wearer X. The mount body 100 may further include a lower mount 120 coupled to the dorsal surface of the wearer X at a position close to the lumbar spine of the wearer X in the state of being vertically spaced apart from the upper mount 110. The mount body 100 may also include a mount link 130 extending vertically so as to connect the upper mount 110 to the lower mount 120.

The upper mount 110 is positioned at an upper portion of the dorsal surface of the wearer X and is coupled thereto. The upper mount 110 may be positioned at a height close to the shoulder blade of the wearer X. The upper mount 110 may include an upper harness 111 which extends in a plane corresponding to the dorsal surface of the wearer X so as to be in contact with the dorsal surface of the wearer X.

The lower mount 120 is positioned at a lower portion of the dorsal surface of the wearer X and is coupled thereto. The lower mount 120 may be positioned at a height close to the lumbar spine of the wearer X.

The mount link 130 may extend vertically in a direction that is parallel to the direction in which the spine of the wearer X extends so as to correspond to the spine of the wearer X. The mount link 130 may be positioned on the dorsal surface of the wearer X. The mount link 130, which is intended to connect the upper mount 110 to the lower mount 120, is able to securely couple both the upper mount 110 and the lower mount 120 to the upper body of the wearer X.

The lower mount 120 may be coupled to the lower back or hip of the wearer X via a lower harness 121. The upper mount 110 may be coupled to the wearer X via the upper harness 111 which extends in a forward direction of the wearer X by way of the shoulder of the wearer X and is coupled to the lower harness 121 or the lower mount 120.

The lower harness 121 may be securely coupled to a lower portion of the upper body or the lower body of the wearer X surrounding the lower back or hip of the wearer X. In other words, the lower harness 121 may be secured to the body of the wearer X at the lateral side surface of the wearer X in conjunction with a waist belt.

The upper harness 111 may extend in a forward direction from the dorsal surface of the wearer X by way of the shoulder. The upper harness 111 may be coupled to the lower harness 121 or the lower mount 120. In other words, the upper harness 111 may extend in a forward direction from the dorsal surface of the wearer X by way of the shoulder, in the manner of a brace.

The mount link 130 may be coupled to the lower mount 120 so as to slide vertically. Specifically, the mount link 130 may form a 4-bar link structure together with a lower link and may slide vertically depending on the length of the lower back of the wearer X. Consequently, by virtue of the vertical sliding, the lower mount 120 may be moved in an anteroposterior direction so as to compensate for curvature of the dorsal surface of the wearer X.

More specifically, the mount body may further include a first connecting link 140 and a second connecting link 150, which are connected to the mount link 130 and the lower mount 120 in the state of being vertically spaced apart from each other. The first connecting link 140 and the second connecting link 150 may be rotatably coupled to one or more of the mount link 130 and the lower mount 120.

The first connecting link 140 and the second connecting link 150 may be vertically spaced apart from each other. Each of the first connecting link 140 and the second connecting link 150 may be coupled at two ends thereof to the lower mount 120 and the mount link 130. At least one of the two ends of each of the first connecting link 140 and the second connecting link 150 may be rotatably coupled to the mount link 130 or the lower mount 120.

In other words, the first connecting link 140, the second connecting link 150, the lower mount 120 and the mount link 130 may form a 4-bar link structure such that vertical sliding of the lower mount 120 and the mount link 130 results in variation in distance therebetween in an anteroposterior direction.

The wearable apparatus may further include a support link 700. The support link 700 is coupled at one end thereof to the shoulder frame 200 so as to be rotated about a rotational axis that is perpendicular to a sliding direction of the support link 700 and which is slidable laterally along the shoulder frame 200. The other end of the support link 700 is rotatably coupled to the mount body 100 via a rotational shaft. The support link 700 functions to transmit force that counteracts the force that supports the compensation frame 400 to the mount body 100.

Specifically, one end of the support link 700 may be coupled to the shoulder frame 200 so as to be rotatable and slidable about the rotational shaft that is parallel to the mount link 130. The other end of the support link 700 may be coupled to the mount link 130 such that the other end is rotatable in a direction that is parallel to the mount link 130 and the one end is vertically rotated about the other end.

In other words, one end of the support link 700 may be slidably coupled to the shoulder frame 200 (particularly, a second shoulder frame 220 to be described later). The other end may be rotatably coupled to the mount link 130.

The support link 700 may transmit counteracting force to the mount body 100 so as to counteract supporting force generated from the compensation frame 400. In other words, the support link 700 may connect the mount link 130, which connects the upper mount 110 to the lower mount 120, to the shoulder frame 200.

In particular, the one end of the support link 700 may be coupled to the second shoulder frame 220 via a rotational shaft that is parallel to the mount link 130 so as to be slidable in a lateral direction in which the second shoulder frame 220 extends and to be rotatable about the rotational shaft that is parallel to the mount link 130. The other end of the support link 700 may be coupled to the rotational shaft 131, which is laterally spaced apart from the mount link 130 and which extends in the direction of gravitational force, which is parallel to the mount link 130. Consequently, it is possible to compensate for variation in length or direction, which is caused by rotation of the shoulder frame 200 about a rotational axis that extends in an anteroposterior direction perpendicular to the dorsal surface of the wearer X or relative sliding of the first shoulder frame 210 and the second shoulder frame 220.

Figure 5:
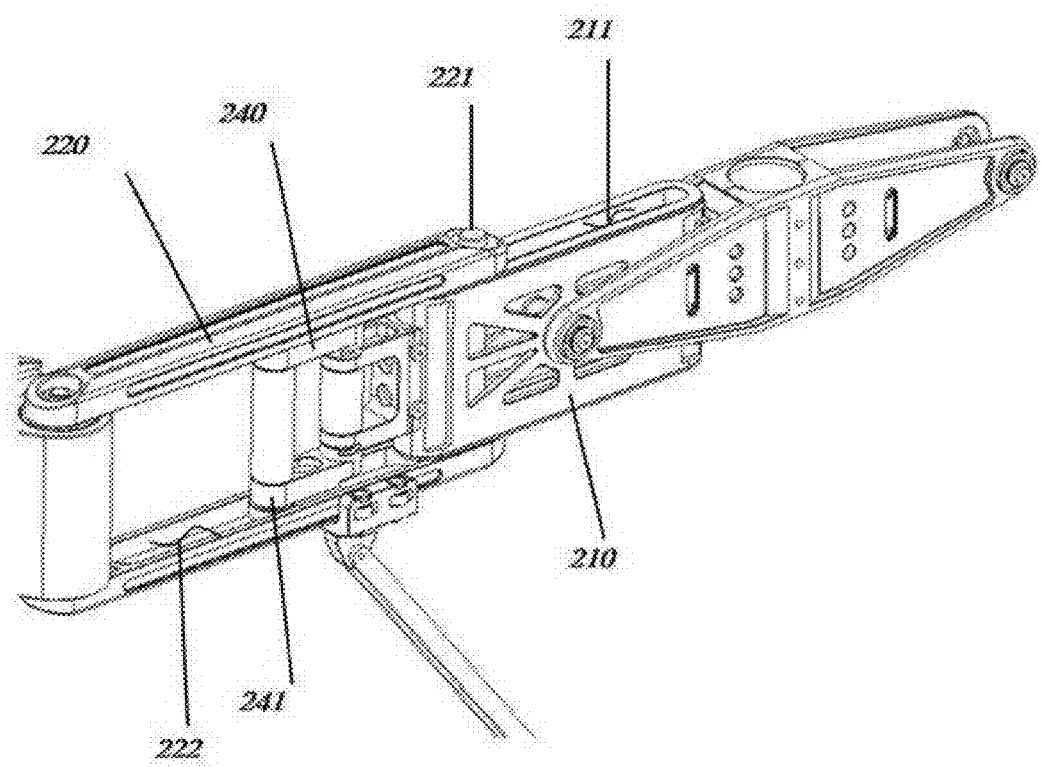
FIGS. 5-7 are views showing a shoulder frame of the wearable apparatus according to an embodiment of the present disclosure.
Figure 6:
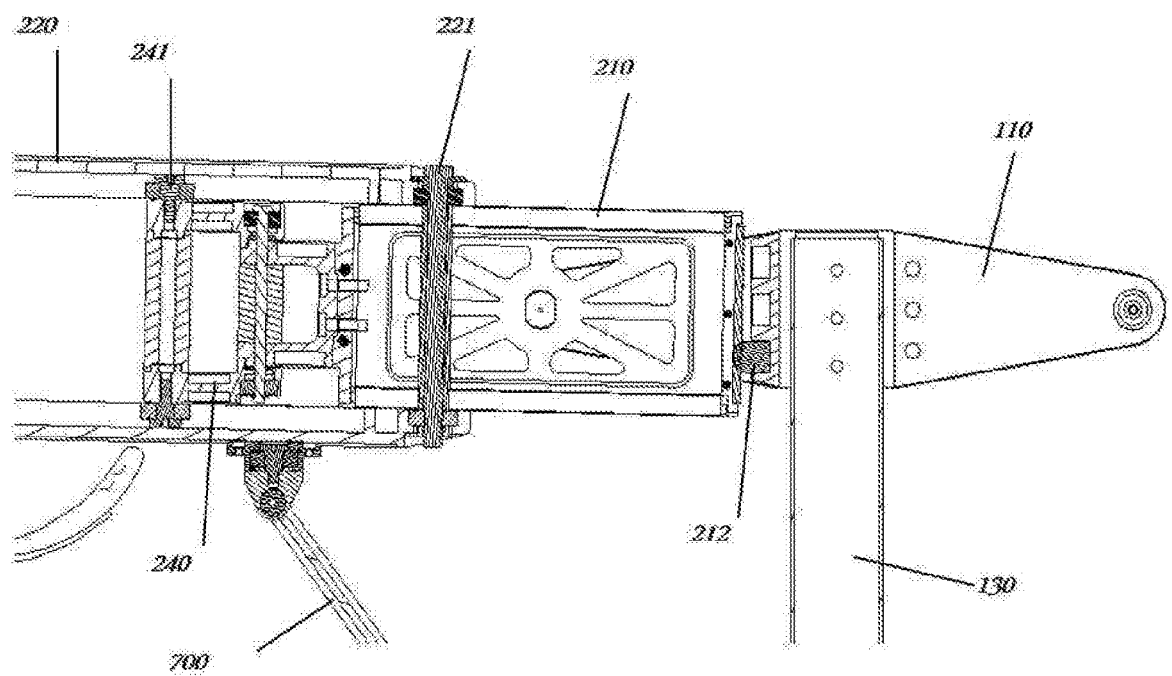
Figure 7:
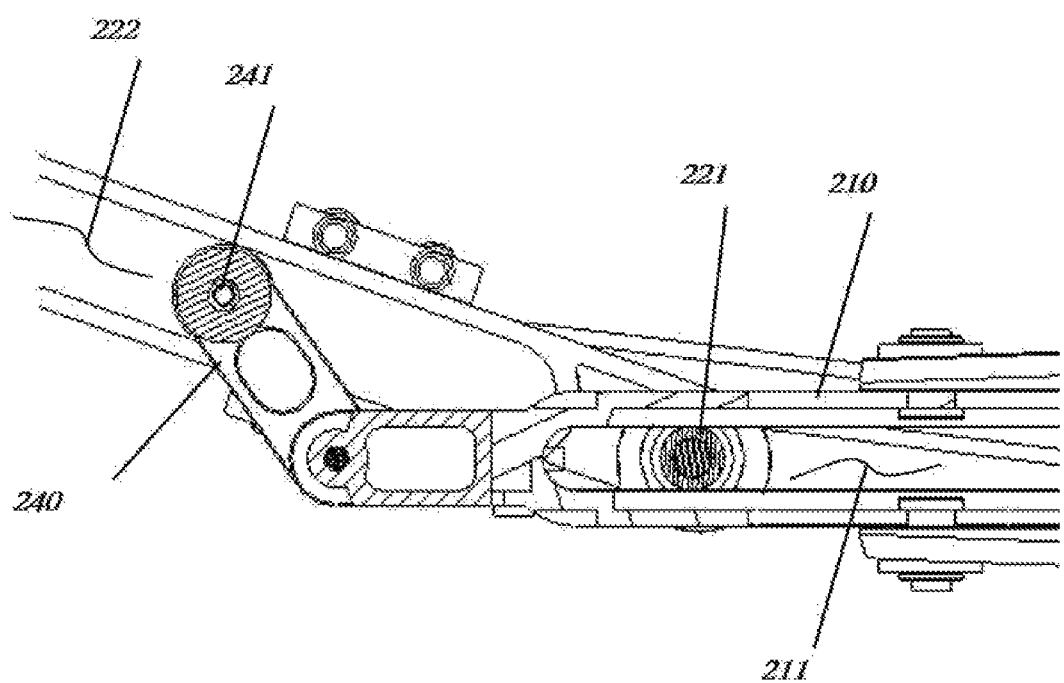

FIGS. 5-7 show the shoulder frame 200 according to the embodiment of the present disclosure.

Referring to FIGS. 5-7, the wearable apparatus may include the shoulder frame 200, one end of which is coupled to the mount body 100 at the dorsal surface of the wearer X, and the other end of which is vertically rotatable about the one end of the shoulder frame 200 in the state of being in contact with the dorsal surface of the wearer X.

The shoulder frame 200 may include a first shoulder frame 210, a second shoulder frame 220, a third shoulder frame 230 (shown in FIG. 8) and a fourth shoulder frame 250 (shown in FIG. 8), which are arranged in this order from one side to the other side and will be described later. The first shoulder frame 210 may be coupled to the mount body 100 so as to be rotated about a rotational axis that extends in an anteroposterior direction. In other words, one end of the first shoulder frame 210 may be coupled to the mount body 100. The other end of the first shoulder frame 210 may be vertically rotated about the one end, serving as a rotational axis.

Consequently, the wearable apparatus has an advantage of naturally simulating the upward motion of the shoulder blade by a motion in which the wearer X lifts his/her shoulder blade or by a motion in which the wearer X rotates his/her upper arm.

The shoulder frame 200 may include the first shoulder frame 210 coupled to the mount body 100. The shoulder frame 200 may further include the second shoulder frame 220 which is slidable laterally with respect to the first shoulder frame 210 at the dorsal surface of the wearer X and which is rotatable in a lateral direction about the first shoulder frame 210. The first shoulder frame 210 and the second shoulder frame 220 may extend laterally at the dorsal surface of the wearer X so as to be parallel to the plane of the drawing.

The first shoulder frame 210 and the second shoulder frame 220 may be coupled to each other so as to slide relative to each other in a lateral direction from the center of the wearer X and to be parallel to the plane of the drawing, thereby allowing the length thereof in a lateral direction to be varied. Furthermore, the first shoulder frame 210 and the second shoulder frame 220 may be coupled to each other so as to be rotatable with respect to each other about a rotational axis that extends in a vertical direction perpendicular to the plane of the drawing (i.e., the direction of gravitational force).

The second shoulder frame 220 may be coupled to the first shoulder frame 210, which is coupled to the mount body 100, so as to be rotatable in a lateral direction only within a predetermined rotational angle with respect to the first shoulder frame 210. In other words, the second shoulder frame 220 which is coupled to the first shoulder frame 210 so as to be rotated relative thereto about a rotational axis that extends in a vertical direction perpendicular to the plane of the drawing (i.e., the direction of gravitational force), may be rotated with respect to the first shoulder frame 210 only within a predetermined rotational angle. Rotation of the second shoulder frame 220 beyond the rotational angle may be restricted.

Specifically, the first shoulder frame 210 may have a first sliding hole 211, which extends in the lateral direction of the wearer X. One end of the second shoulder frame 220 may be fitted into the first sliding hole 211 and may slide along the first sliding hole 211.

In other words, the first shoulder frame 210 may have the first sliding hole 211, which extends in the lateral direction of the wearer X, which is the same direction as the direction in which the first shoulder frame 210 extends. The one end of the second shoulder frame 220 may be provided with a first roller 221 which is fitted into the first sliding hole 211 and slides while being rotated in the first sliding hole 211. Consequently, since the second shoulder frame 220 may slide laterally with respect to the first shoulder frame 210, it is possible to compensate for variation in lateral distance from the mount body 100 positioned at the center of the wearer X, which is caused by a motion in which the wearer X rotates his/her upper arm in a horizontal plane.

The second shoulder frame 220 may have a second sliding hole 222 which extends in the lateral direction of the wearer X. The second shoulder frame 220 may further include a restrictor 240, one end of which is rotatably coupled to the first shoulder frame 210 at a point that is laterally spaced apart from the first sliding hole 211 and the other end of which is slidably and rotatably coupled to the second sliding hole 222. Thereby, the relative rotational angle between the first shoulder frame 210 and the second shoulder frame 220 is restricted.

The second shoulder frame 220 may have the second sliding hole 222, which extends in a direction that is parallel to the direction in which the second shoulder frame 220 extends. The other end of the second shoulder frame 220 may be provided with a second roller 241. The second roller 241 is fitted into the second sliding hole 222 such that the other end of the restrictor 240 slides along the second sliding hole 222 while the second roller 241 is rotated in the second sliding hole 222. The one end of the restrictor 240 may be coupled to the first shoulder frame 210. Specifically, the one end of the restrictor 240 may be rotatably coupled to the first shoulder frame 210 at a point that is spaced apart from the first sliding hole 211 toward the second shoulder frame 220.

Consequently, since the second shoulder frame 220 slides in the direction in which the first shoulder frame 210 extends, and the restrictor 240, coupled to the first shoulder frame 210, is coupled to the second shoulder frame 220 so as to slide along the second shoulder frame 220, the relative rotational angle between the first shoulder frame 210 and the second shoulder frame 220 in a direction perpendicular to the plane of the drawing may be restricted due to the length of the restrictor 240.

The mount body 100 may include a stopper 212. The stopper 212 functions to allow the other end of the first shoulder frame 210 to be rotated vertically about the one end and to cause the other end of the first shoulder frame 210 to be rotated only within a predetermined rotational angle.

In particular, the stopper 212 may prevent the first shoulder frame 210 from being rotated downwards in a direction that is parallel to the plane of the drawing. The stopper 212 may also restrict the angle to which the first shoulder frame 210 is rotated in an upward direction of the shoulder joint of the wearer X which is parallel to the plane of the drawing. Consequently, there is an effect of being able to prevent undesired rotation or motion of the wearable apparatus while simulating the motion of the wearer X.

The shoulder frame 200 may further include the third shoulder frame 230, which is coupled to the second shoulder frame 220, which is positioned at the dorsal surface of the wearer X, so as to be rotated in a lateral direction, and which extends in a direction toward the lateral side surface of the wearer X. The shoulder frame 200 may also include the fourth shoulder frame 250 which is positioned at the lateral side surface of the wearer X. The fourth shoulder frame 250 may be coupled to the third shoulder frame 230 so as to be rotated in a lateral direction and to allow one end of the mounting frame 300 to be torsionally rotated.

The third shoulder frame 230 may be coupled to the second shoulder frame 220 so as to be rotated in a lateral direction that is parallel to the plane of the drawing about a rotational axis perpendicular to the plane of the drawing. The fourth shoulder frame 250 may be rotated in a direction that is parallel to the plane of the drawing about a rotational axis perpendicular to the plane of the drawing.

In particular, the third shoulder frame 230 may be coupled to the other end of the second shoulder frame 220, which is in contact with the dorsal surface of the wearer X, and may extend toward the lateral side surface of the wearer X. The fourth shoulder frame 250, which is positioned at the lateral side surface of the wearer X, may be rotated in a lateral direction that is parallel to the plane of the drawing about the rotational axis perpendicular to the plane of the drawing. Specifically, the third shoulder frame 230 and the fourth shoulder frame 250 are positioned between the second shoulder frame 220, which is positioned at the dorsal surface of the wearer X, and the compensation frame 400, which is positioned at the lateral side surface of the wearer X. The third shoulder frame 230 and the fourth shoulder frame 250 may realize a rotational angle close to a right angle by virtue of two rotational axes so as to surround the shoulder of the wearer X. Consequently, the shoulder frame 200 may extend so as to stably surround the wearer X toward the lateral side surface from the dorsal surface of the wearer X and to allow natural motion.

One end of the mounting frame 300 may be coupled to the fourth shoulder frame 250 so as to be torsionally rotated.

Figure 8:
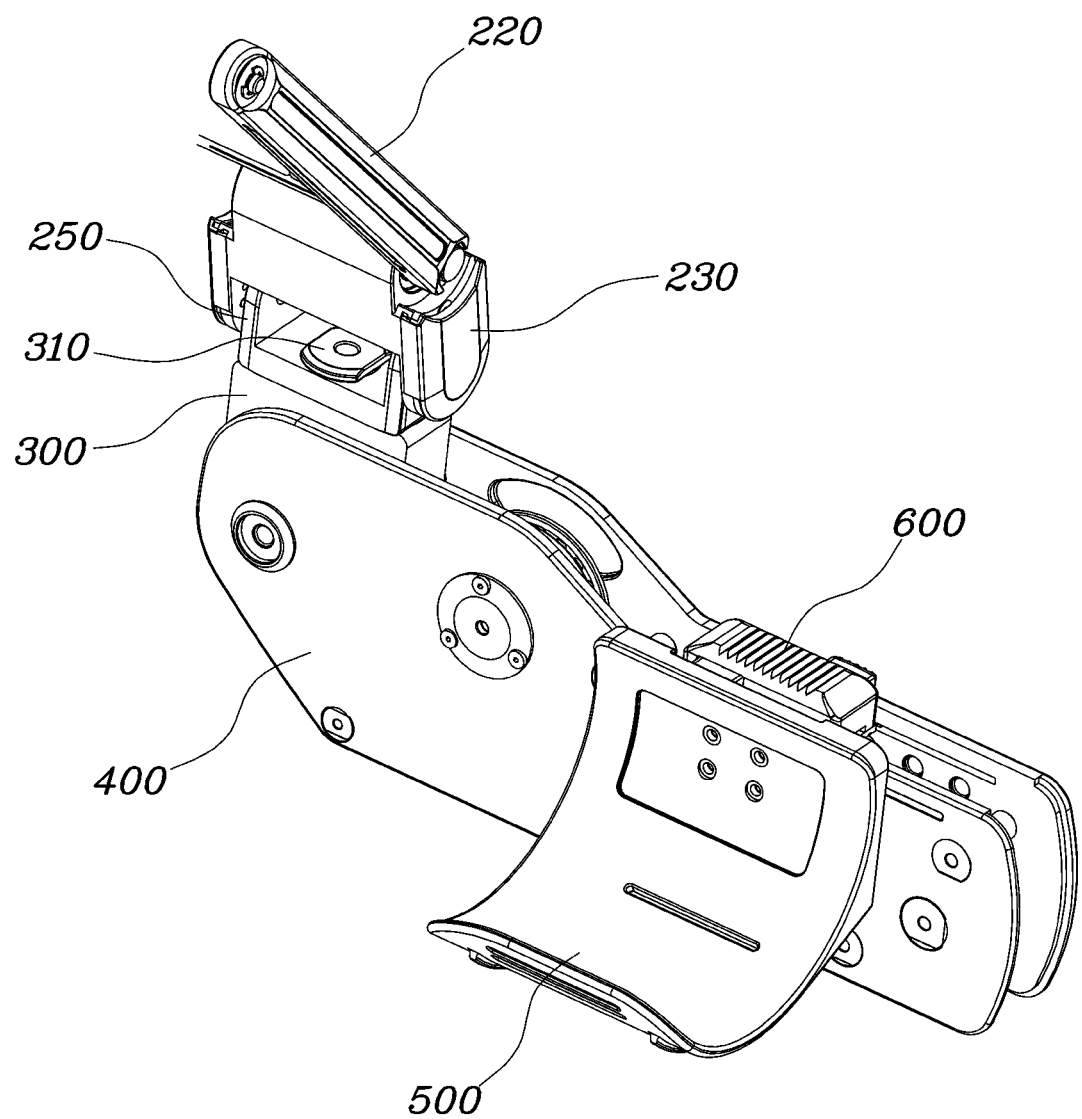
FIGS. 8-10 are views showing a mounting frame of the wearable apparatus according to an embodiment of the present disclosure.
Figure 9:
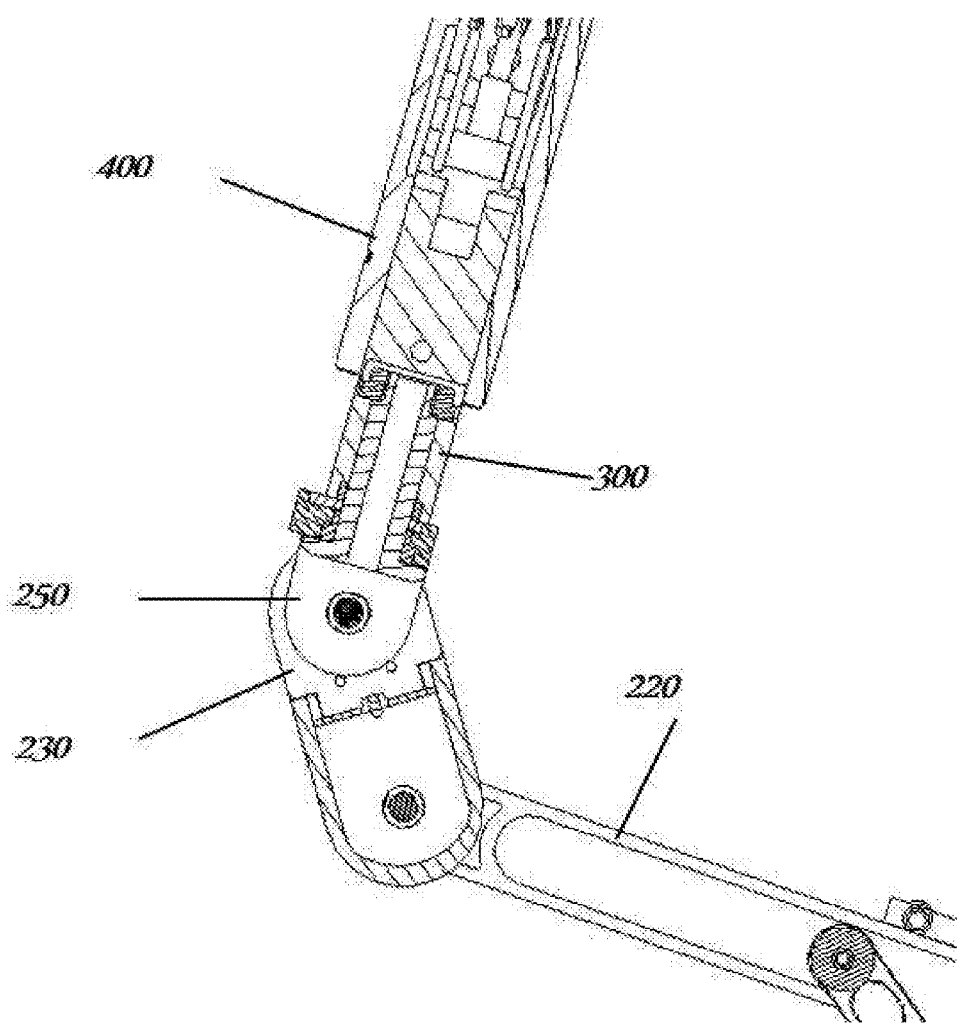
Figure 10:
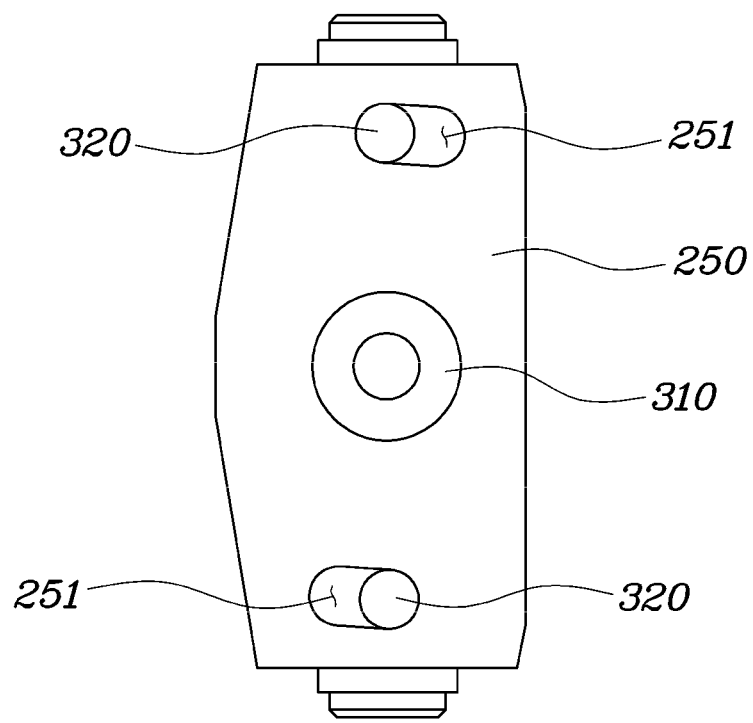
Figure 11:
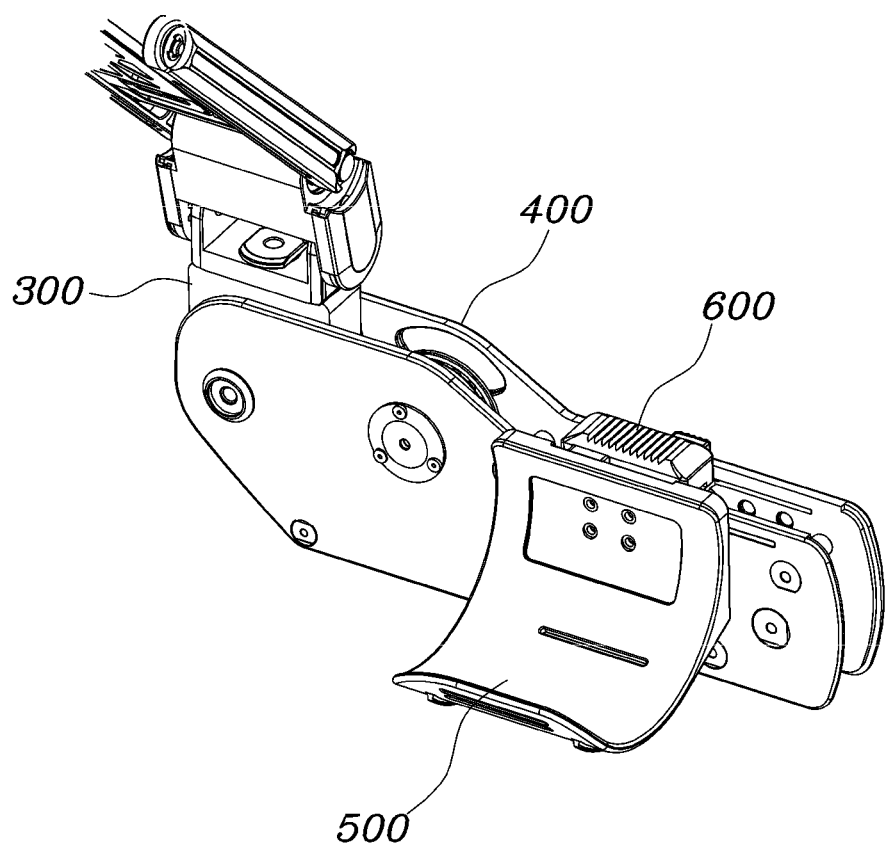
FIGS. 11-14 are views showing a compensation frame of the wearable apparatus according to an embodiment of the present disclosure.
Figure 12:
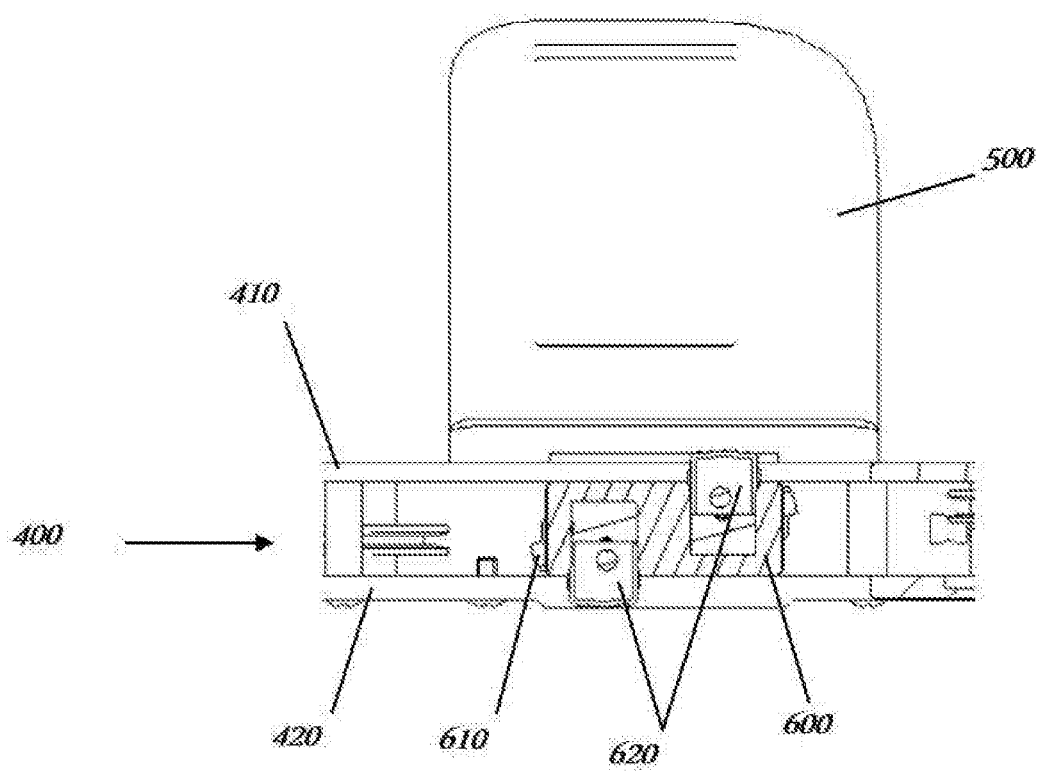
Figure 13:
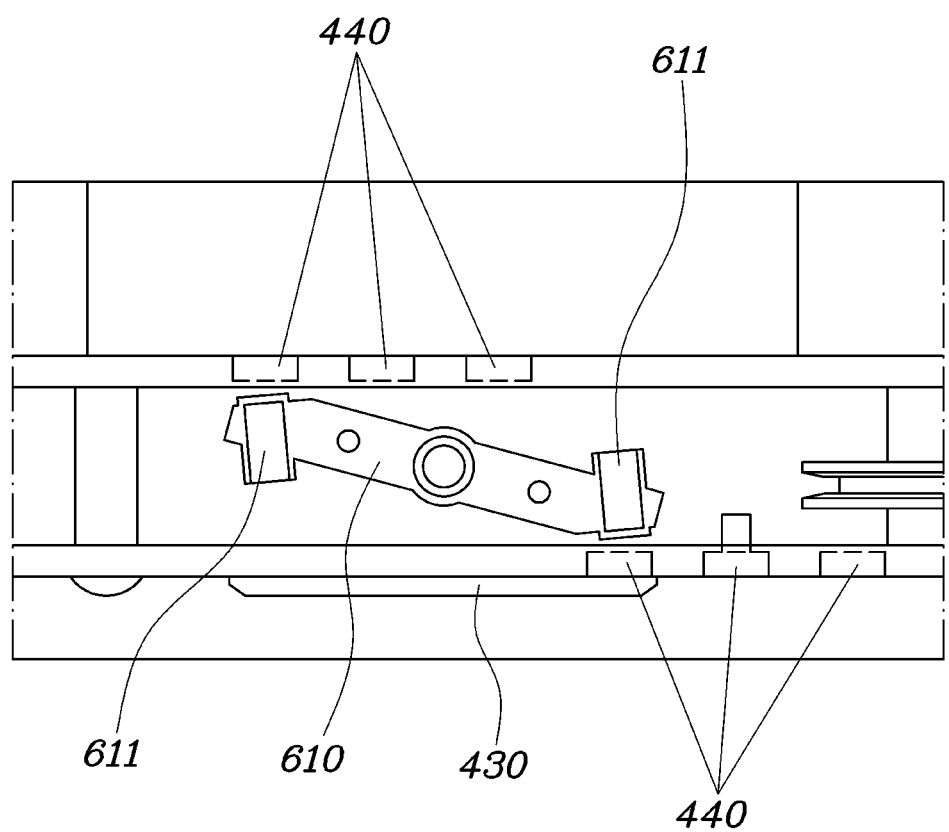

FIGS. 8-10 show the mounting frame 300 according to an embodiment of the present disclosure.

Referring to FIGS. 8-10, the wearable apparatus may further include the mounting frame 300, which is coupled at one end thereof to the other end of the shoulder frame 200 so as to be torsionally rotated. The mounting frame 300 may be coupled to the end of the fourth shoulder frame 250 of the shoulder frame 200 which extends in a lateral direction.

The one end of the mounting frame 300 may be provided with an insert rotational shaft 310, which is coupled to the other end of the shoulder frame 200 so as to be torsionally rotated. The mounting frame 300 may be provided with an insert protrusion 320, which is positioned at a point spaced apart from the insert rotational shaft 310 between the one end of the mounting frame 300 and the other end of the shoulder frame 200 and which projects toward the shoulder frame 200. The shoulder frame 200 may have therein an insert hole 251, which is formed so as to correspond to the orbit that is defined by the insert protrusion 320 when the mounting frame 300 is torsionally rotated to a predetermined angle. Since the insert protrusion 320 is disposed in the insert hole 251, the mounting frame 300 may be torsionally rotated within a predetermined angle.

The mounting frame 300 may extend from the shoulder frame 200 in a direction that is parallel to a horizontal plane. The insert rotational shaft 310 may be formed at the center of the side surface of the one end of the mounting frame 300 and may be fitted into the side surface of the fourth shoulder frame 250. The insert rotational shaft 310 may project from a side surface of the one end of the mounting frame 300 that faces the other end of the fourth shoulder frame 250 and may be rotatably coupled to the other end of the fourth shoulder frame 250.

The fourth shoulder frame 250 may be rotatably coupled to the third shoulder frame 230 which extends obliquely toward the lateral side surface from the dorsal surface of the wearer X. The mounting frame 300, which is coupled to the fourth shoulder frame 250 so as to be rotatable about a rotational axis perpendicular to the plane of the drawing, may extend in an anteroposterior direction from the lateral side surface of the wearer X.

In other words, the mounting frame 300 may be positioned at the lateral side surface of the wearer X and may be coupled to the fourth shoulder frame 250 so as to be torsionally rotated about a rotational axis that is parallel to an anteroposterior direction. Consequently, the wearer X is able to perform a torsional motion of pronating his/her upper arm inwards and of supinating his/her upper arm outwards.

The insert protrusion 320 may be formed at the side surface of the one end of the mounting frame 300 that faces the other end of the shoulder frame 200 (i.e., the fourth shoulder frame 250) so as to be positioned at a point that is spaced apart from the insert rotational shaft 310.

The insert hole 251 may be formed in a side surface of the other end of the shoulder frame 200 that faces the one end of the mounting frame 300. Additionally, the insert hole 251 may be formed so as to correspond to the orbit that is defined by the insert protrusion 320 when the mounting frame 300 is torsionally rotated to a predetermined angle with respect to the shoulder frame 200. The insert hole 251 may be formed such that the insert protrusion 320 is torsionally rotated only within a predetermined angle. The insert hole 251 and the insert protrusion 320 may also be reversely formed.

FIGS. 11-14 show the compensation frame 400 according to an embodiment of the present disclosure.

Referring to FIGS. 11-14, the wearable apparatus may further include the supporter 500, which is configured so as to support the upper arm of the wearer X in the state of surrounding part of the upper arm. The wearable apparatus may also include the compensation frame 400 which is integrally coupled to the supporter 500 and which is coupled to the mounting frame 300 so as to be rotated together with the supporter 500 about the shoulder joint of the wearer X. The compensation frame 400 generates supporting force that varies depending on the angle to which the compensation frame 400 is rotated with respect to the mounting frame 300.

The compensation frame 400 may be coupled to the mounting frame 300 so as to be rotated about the shoulder joint of the wearer X perpendicular to the lateral side surface of the wearer X. In other words, the compensation frame 400 may be coupled to the mounting frame 300 so as to allow the upper arm of the wearer X, which is supported by the supporter 500, to be rotated vertically about the shoulder joint of the wearer X.

The supporter 500 is configured so as not to completely surround the upper arm of the wearer X but to surround only part of the upper arm of the wearer X. The supporter 500 may surround a lower portion of the upper arm in order to provide the upper arm with supporting force.

In particular, the compensation frame 400 may generate supporting force that varies depending on the angle to which the compensation frame 400 is rotated with respect to the mounting frame 300. The supporting force may generate a torque of rotating the upper arm of the wearer X upwards about the shoulder joint against a gravitational force.

The compensation frame 400 may include a first plate 410, which is positioned at the lateral side surface of the upper arm of the wearer X so as to be brought into contact therewith. The compensation frame 400 may also include a second plate 420 which is laterally spaced apart from the first plate 410. The space that is defined by the first plate 410 and the second plate 420, which are laterally spaced apart from each other, may be provided with a gravity-compensating device, a switch 600 and the like. The supporter 500 may be coupled to the first plate 410 or the second plate 420.

The compensation frame 400 may further include the switch 600, which slides together with the supporter 500 in the direction in which the compensation frame 400 extends, and which is parallel to the upper arm of the wearer X, and which is capable of being engaged with the compensation frame 400 so as to restrict sliding movement of the supporter 500. When the switch 600 is engaged with the compensation frame 400, sliding movement of the supporter 500 may be stopped and the supporter 500 may be rotated together with the compensation frame 400.

The switch 600 may be provided in the space that is defined by the first plate 410 and the second plate 420, which are laterally spaced apart from each other. The switch 600 may extend in a direction that is parallel to the upper arm of the wearer X and may slide in the direction in which the compensation frame 400 extends.

The switch 600 may be integrally formed with the supporter 500. The switch 600 may thus slide together with the supporter 500 along the compensation frame 400. Since the switch 600, which is integrally coupled to the supporter 500, is coupled to the compensation frame 400, the supporter 500 may be rotated or moved together with the compensation frame 400. Consequently, the supporter 500 may slide so as to fit the body structure of the wearer X and may thus stably support the upper arm of the wearer X.

Specifically, the compensation frame 400 may be provided with a sliding rail 430 capable of sliding in the direction in which the compensation frame 400 extends. The compensation frame 400 may have a plurality of locking holes 440, which are spaced apart from each other along the sliding rail. The switch 600 may include a lever 610 including locking protrusions 611, which project from opposite ends thereof toward the compensation frame 400. The locking protrusions 611 may be fitted into or separated from the locking holes 440 depending on rotation of the lever 610. When the locking protrusions 611 are fitted into the locking holes 440, a sliding movement of the switch 600 along the compensation frame 400 may be blocked.

In other words, the switch 600 may slide along the sliding rail 430 of the compensation frame 400 in the direction in which the compensation frame 400 extends. The switch 600 may include the lever 610 adapted to be rotated in the compensation frame 400. The lever 610 may be rotated about a rotational axis perpendicular to the upper arm of the wearer X or the supporter 500. As the lever 610 is rotated, the opposite ends of the lever 610, which are disposed between the first plate 410 and the second plate 420, may be moved close to or away from the first plate 410 and the second plate 420.

In particular, the lever 610 may be provided at opposite ends thereof with the locking protrusions 611 which project toward the compensation frame 400. Consequently, as the lever 610 is rotated, the locking protrusions 611 may be moved close to or away from the first plate 410 and the second plate 420.

The compensation frame 400 may be provided with the locking holes 440, which are spaced apart from each other along the sliding rail 430. In particular, the first plate 410 and the second plate 420 may have the locking holes 440 formed in the surfaces thereof that face each other. Consequently, by rotation of the lever 610, the locking protrusions 611, which are provided to the opposite ends of the lever 610, may be fitted into or separated from the locking holes 440. When the locking protrusions 611 are fitted into the locking holes 440, the switch 600 may be locked so as not to slide in the direction in which the compensation frame 400 extends.

The switch 600 may include an elastic member (not shown), which functions to provide the elastic force required to rotate the lever 610 in the direction in which the locking protrusions 611 are fitted into the locking holes 440. The elastic member (not shown) may exert elastic force on the lever 610 to rotate the lever 610 in the direction in which the locking protrusions 611 provided on the opposite ends of the lever 610 are fitted into the locking holes 440 in the compensation frame 400. The elastic member (not shown) may be a coil spring disposed around the rotational shaft of the lever 610. Consequently, when external force required to overcome the elastic force of the elastic member is not provided, the locking protrusions 611 are maintained in the state of being fitted into the locking holes 440, thereby restricting the sliding movement of the switch 600.

The switch 600 may include press portions 620 which are spaced apart from the rotational axis of the lever 610 and which project in lateral directions of the lever 610 so as to press the lever 610. When the press portions 620 are pressed by pressing force higher than the elastic force of the elastic member (not shown), the lever 610 may be rotated in the direction in which the locking protrusions 611 are separated from the locking holes 440.

The press portions 620 may be provided at a position near the opposite ends of the lever 610 so as to press the opposite ends of the lever 610 and thus rotate the lever 610. In other words, when the press portions 620 are pressed by the wearer X, the press portions 620 rotate the lever 610 while sliding. Consequently, the locking protrusions 611 are separated from the locking holes 440, thereby allowing the switch 600 to slide. Accordingly, the wearer X is able to conveniently rotate the lever 610 by pressing the press portions 620, which are exposed from the compensation frame 400, thus pressing the opposite ends of the lever 610.

A permanent magnet may be provided at least at one of each of the locking protrusions 611 and each of the locking holes 440 so as to provide attractive force generated by the permanent magnet. For example, the permanent magnets may be provided at the locking protrusions 611 formed at the opposite ends of the lever 610. Permanent magnets or conductors, which generate attractive force by virtue of the magnetic interaction with the magnets may be provided at the locking protrusions 611. Consequently, the locking protrusions 611 may be easily attracted to the locking holes 440 and then fitted into the locking holes 440 by virtue of the magnetic force.

Furthermore, by virtue of the elastic force caused by the elastic member (not shown) and the magnetic force, the locking protrusions 611 may be fitted into the locking holes 440. The supporter 500 and the switch 600 may thus be maintained in the locked state so as not to slide along the compensation frame 400 as long as pressing force is not provided to the press portions 620.

Figure 14:
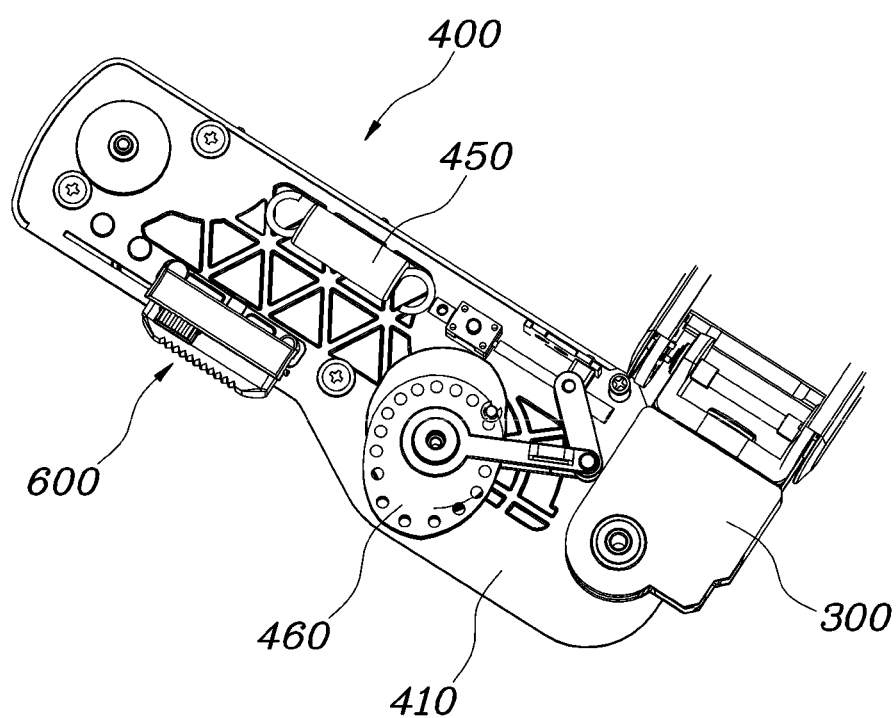

FIG. 14 shows the interior of the compensation frame 400. The compensation frame 400 may be provided with a spring 450 constituting a gravitational-force-compensating unit, which provides elastic force that varies in intensity depending on the angle to which the compensation frame 400 is rotated with respect to the mounting frame 300 so as to generate supporting force counteracting gravitational force. In other words, the gravitational-force-compensating unit may include the spring 450 so as to provide supporting force resulting from elastic force that varies in intensity depending on the angle to which the compensation frame 400 is rotated with respect to the mounting frame 300.

Furthermore, the gravitational-force-compensating unit included in the compensation frame 400 may include a cam 460 coupled to a shaft, which is rotatably coupled to the first plate 410 and the second plate 420. A wire (not shown) may be wound around or unwound from the shaft by rotation of the compensation frame 400 relative respect to the mounting frame 300. The cam 460 may have an asymmetric shape and may be connected to the spring 450. The cam 460 may have a cam profile such that the elastic force of the spring 450 varies depending on the angle to which the compensation frame 400 is rotated with respect to the mounting frame 300.

The cam profile may be designed so as to provide supporting force that has the maximum intensity when the upper arm of the wearer X is positioned parallel to a horizontal plane and which is gradually decreased as the upper arm of the wearer X is rotated downwards.

A wearable apparatus for increasing muscular force according to another embodiment of the present disclosure includes a mount body 100 securely coupled to an upper body of the wearer X. The wearable apparatus further includes a shoulder frame 200 which is coupled at one end thereof to the mount body 100 at the dorsal surface of the wearer X and which is rotatable vertically at the other end thereof about the one end coupled to the mount body 100. The wearable apparatus also includes a supporter 500 which surrounds part of the upper arm of the wearer X to support the upper arm of the wearer X. The wearable apparatus further includes a compensation frame 400 integrally coupled to the supporter 500 and coupled to the shoulder frame 200 at the lateral side surface of the wearer X. The compensation frame 400 is rotated together with the supporter 500 about the shoulder joint of the wearer X and is intended to generate supporting force that varies depending on the angle to which the compensation frame 400 is rotated about the shoulder joint of the wearer X.

A wearable apparatus for increasing muscular force according to a further embodiment of the present disclosure includes a mount body 100 securely coupled to an upper body of the wearer X. The wearable apparatus further includes a shoulder frame 200 which is coupled at one end thereof to the mount body 100 at the dorsal surface of the wearer X and which is rotatable vertically at the other end thereof about the one end coupled to the mount body 100. The wearable apparatus also includes a support link 700 which is rotatably coupled at one end thereof to a sliding shaft so as to slide laterally along the shoulder frame 200 and which is rotatably coupled to the mount body 100 via a vertical rotational shaft so as to transmit force that counteracts the force that supports a compensation frame 400 to the mount body 100. The wearable apparatus further includes a supporter 500 which surrounds part of the upper arm of the wearer X to support the upper arm of the wearer X. The wearable apparatus also includes the compensation frame 400 which is integrally coupled to the supporter 500 so as to be rotated therewith about the shoulder joint of the wearer X and which is connected to the shoulder frame at the lateral side surface of the wearer X so as to generate supporting force that varies depending on the angle to which the compensation frame 400 is rotated about the shoulder joint of the wearer X.

As is apparent from the above description, the present disclosure provides a wearable apparatus for increasing muscular force, which is configured to have the same structure as the skeletal structure of a wearer so as to minimize restriction on motion of the wearer, thereby realizing natural motion of the wearer.

In addition, since the wearable apparatus has a structure capable of sliding laterally along an axis of a shoulder joint of a wearer, it is possible to simulate natural motion of rotating an upper arm of a wearer in a direction that is parallel to a horizontal plane. It is possible to perform a torsional motion of pronating the upper arm inwards or supinating the upper arm outwards.

Although various embodiments of the present disclosure have been disclosed for illustrative purposes, a person having ordinary skill in the art will appreciate that various modifications, additions and substitutions are possible, without departing from the scope and spirit of the disclosure as disclosed in the accompanying claims.

What is claimed is:

1. A wearable apparatus for increasing muscular force, the wearable apparatus comprising:
   a mount body configured to be coupled to an upper body of a wearer;
   a shoulder frame having one end coupled to the mount body and configured to be located at a dorsal surface of the wearer and having another end that is rotatable about the one end at the dorsal surface of the wearer in up and down direction;
   a mounting frame having one end coupled to the other end of the shoulder frame so as to be torsionally rotated;
   a supporter, which is configured to surround part of an upper arm of the wearer to support the upper arm of the wearer; and
   a compensation frame integrally coupled to the supporter so as to be rotated together with the supporter about a shoulder joint of the wearer, the compensation frame being capable of generating supporting force that varies depending on an angle to which the compensation frame is rotated with respect to the mounting frame.

2. The wearable apparatus according to claim 1, wherein the mount body includes:
   an upper mount configured to be coupled to the dorsal surface of the wearer at a height close to a shoulder blade of the wearer;
   a lower mount configured to be coupled to the dorsal surface of the wearer at a position close to a lumbar spine of the wearer in a state of being vertically spaced apart from the upper mount; and
   a mount link extending vertically so as to connect the upper mount to the lower mount.

3. The wearable apparatus according to claim 2, wherein the lower mount is configured to be coupled to a lower back or hip of the wearer via a lower harness, and the upper mount is coupled to the wearer via an upper harness, the upper harness extending in a forward direction of the wearer by way of a shoulder of the wearer and being coupled to the lower harness or the lower mount.

4. The wearable apparatus according to claim 2, wherein the mount link is coupled to the lower mount so as to slide vertically.

5. The wearable apparatus according to claim 4, wherein the mount body includes a first connecting link and a second connecting link, which are connected to the mount link and the lower mount in the state of being vertically spaced apart from each other, the first connecting link and the second connecting link being rotatably coupled to one or more of the mount link and the lower mount.

6. The wearable apparatus according to claim 2, further comprising a support link having one end, which is slidably coupled to the shoulder frame so as to be rotated about a rotational axis that is parallel to the mount link, and the support link having another end that is coupled to the mount link so as to allow the one end of the support link to be rotated vertically about the other end of the support link in a direction that is parallel to the mount link.

7. The wearable apparatus according to claim 1, further comprising a support link having one end, which is coupled to the shoulder frame so as to be rotated about a rotational axis that is perpendicular to a sliding direction of the support link and so as to be slidable laterally along the shoulder frame, and the support link having another end that is coupled to the mount body via a rotational shaft which extends vertically, the support link configured to transmit, to the mount body, a force that counteracts force that supports the compensation frame.

8. The wearable apparatus according to claim 1, wherein the shoulder frame includes:
 a first shoulder frame coupled to the mount body; and
 a second shoulder frame, which is configured to be positioned at the dorsal surface of the wearer and is coupled to the first shoulder frame so as to slide laterally with respect to the first shoulder frame and to be rotated laterally about the first shoulder frame.

9. The wearable apparatus according to claim 8, wherein the second shoulder frame is coupled to the first shoulder frame so as to be rotated laterally with respect to the first shoulder frame only within a predetermined angle.

10. The wearable apparatus according to claim 8, wherein the first shoulder frame includes a first sliding hole, which extends in a lateral direction of the wearer, and one end of the second shoulder frame is fitted into the first sliding hole and slides along the first sliding hole.

11. The wearable apparatus according to claim 10, wherein the second shoulder frame includes a second sliding hole, which extends in a lateral direction of the wearer, and the shoulder frame includes a restrictor having one end, which is rotatably coupled to the first shoulder frame at a point that is laterally spaced apart from the first sliding hole, and the restrictor having another end, which is slidably and rotatably coupled to the second sliding hole, thereby restricting a relative rotational angle between the first shoulder frame and the second shoulder frame.

12. The wearable apparatus according to claim 8, wherein the mount body includes a stopper, which allows one end of the first shoulder frame to be rotated vertically about another end of the first shoulder frame and to cause the one end of the first shoulder frame to be rotated only within a predetermined angle.

13. The wearable apparatus according to claim 8, wherein the shoulder frame further includes:

a third shoulder frame, which is coupled to the second shoulder frame configured to be positioned at the dorsal surface of the wearer so as to be rotated in a lateral direction and which extends in a direction toward a lateral side surface of the wearer; and
 a fourth shoulder frame, which is configured to be positioned at the lateral side surface of the wearer, the one end of the mounting frame being coupled to the fourth shoulder frame so as to be torsionally rotated.

14. The wearable apparatus according to claim 1, wherein the one end of the mounting frame is coupled to the other end of the shoulder frame via an insert rotational shaft, which is coupled to the other end of the shoulder frame so as to be torsionally rotated, and wherein the mounting frame includes an insert protrusion, which is positioned at a point spaced apart from the insert rotational shaft between the one end of the mounting frame and the other end of the shoulder frame and which projects toward the shoulder frame, and
 wherein the shoulder frame includes an insert hole, which is formed so as to correspond to an orbit that is defined by the insert protrusion when the mounting frame is torsionally rotated to a predetermined angle, the insert protrusion being disposed in the insert hole so as to allow the mounting frame to be torsionally rotated within a predetermined angle.

15. The wearable apparatus according to claim 1, wherein the compensation frame includes a spring, which provides elastic force that varies in intensity depending on an angle to which the compensation frame is rotated with respect to the mounting frame so as to generate supporting force counteracting gravitational force.

16. The wearable apparatus according to claim 1, further comprising a switch, which slides together with the supporter in a direction in which the compensation frame extends, which is configured to be parallel to the upper arm of the wearer, and which is capable of being engaged with the compensation frame so as to restrict sliding movement of the supporter,
 wherein, when the switch is engaged with the compensation frame, sliding movement of the supporter is stopped and the supporter is rotated together with the compensation frame.

17. The wearable apparatus according to claim 16, wherein the compensation frame includes a sliding rail capable of sliding in the direction in which the compensation frame extends, and a plurality of locking holes, which are spaced apart from each other along the sliding rail, and
 wherein the switch includes a lever including locking protrusions, which project from opposite ends thereof toward the compensation frame and which are fitted into or separated from the locking holes depending on rotation of the lever, wherein a sliding movement of the switch along the compensation frame being blocked when the locking protrusions are fitted into the locking holes.

18. The wearable apparatus according to claim 17, wherein the switch includes an elastic member, which provides elastic force required to rotate the lever in a direction in which the locking protrusions are fitted into the locking holes.

19. The wearable apparatus according to claim 18, wherein the switch includes a press portion, which is spaced apart from a rotational axis of the lever and which projects in a lateral direction of the lever so as to press the lever, the lever being rotated in a direction in which the locking protrusion is separated from the locking holes when the press portions are pressed by a pressing force, which is higher than an elastic force of the elastic member.

20. The wearable apparatus according to claim 16, wherein a permanent magnet is provided at least at one of each of the locking protrusions and each of the locking holes so as to provide attractive force generated by the permanent magnet.

21. A wearable apparatus for increasing muscular force, the wearable apparatus comprising:
- a mount body configured to be coupled to an upper body of a wearer;
- a shoulder frame having one end, which is coupled to the mount body and configured be located at a dorsal surface of the wearer, and the shoulder frame having another end that is rotatable about the one end of the shoulder frame in up and down direction coupled to the mount body;
- a support link having one end, which is rotatably coupled to a rotational axis that is perpendicular to a sliding direction so as to slide laterally along the shoulder frame, and the support link having another end that is rotatably coupled to the mount body via a vertical rotational shaft so as to transmit, to the mount body, force that counteracts a force that supports a compensation frame;
- a supporter, which is configured to surround part of an upper arm of the wearer to support the upper arm of the wearer; and
- the compensation frame, which is integrally coupled to the supporter so as to be rotated together with the supporter about a shoulder joint of the wearer and which is connected to the shoulder frame and configured to be located at a lateral side surface of the wearer so as to generate supporting force that varies depending on an angle to which the compensation frame is rotated about the shoulder joint of the wearer.

\* \* \* \* \*